(12) United States Patent
Rauch et al.

(10) Patent No.: US 9,810,154 B2
(45) Date of Patent: Nov. 7, 2017

(54) CASING BODY THROUGH WHICH HOT GASES CAN FLOW AND COMPRISING AN INNER HEAT SHIELD

(75) Inventors: Marc Rauch, Regensdorf (CH); Peter Oskar Baldischweiler, Schneisingen (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 864 days.

(21) Appl. No.: 13/215,317

(22) Filed: Aug. 23, 2011

(65) Prior Publication Data

US 2012/0047905 A1    Mar. 1, 2012

(30) Foreign Application Priority Data

Aug. 27, 2010   (CH) ........................ 1390/10

(51) Int. Cl.
| | | |
|---|---|---|
| *F02C 7/24* | (2006.01) | |
| *F01D 25/14* | (2006.01) | |
| *F02K 1/82* | (2006.01) | |
| *F23R 3/00* | (2006.01) | |
| *F23R 3/60* | (2006.01) | |

(52) U.S. Cl.
CPC ............... *F02C 7/24* (2013.01); *F01D 25/14* (2013.01); *F02K 1/822* (2013.01); *F23R 3/002* (2013.01); *F23R 3/60* (2013.01); *F05D 2240/14* (2013.01); *Y02T 50/675* (2013.01)

(58) Field of Classification Search
CPC .......... F01D 25/14; F01D 25/145; F02C 7/24; F02K 1/822; F05D 2240/14; F05D 2240/15; F23R 3/60; F23R 3/00; F16B 19/1036

USPC ............................................. 60/752, 755–757
See application file for complete search history.

(56) References Cited

U.S. PATENT DOCUMENTS

| | | | | |
|---|---|---|---|---|
| 2,760,338 A | * | 8/1956 | Keast | F23R 3/60 60/752 |
| 3,255,559 A | * | 6/1966 | Gaeth et al. | 52/232 |
| 4,121,768 A | * | 10/1978 | Young | 239/127.3 |
| 4,512,699 A | * | 4/1985 | Jackson et al. | 411/368 |
| 4,749,029 A | | 6/1988 | Becker et al. | |
| 5,083,424 A | | 1/1992 | Becker | |
| 5,127,794 A | | 7/1992 | Burge et al. | |
| 5,273,397 A | | 12/1993 | Czachor et al. | |
| 5,279,031 A | * | 1/1994 | Carruthers | F01D 5/025 29/525.02 |
| 5,592,814 A | * | 1/1997 | Palusis et al. | 60/770 |

(Continued)

FOREIGN PATENT DOCUMENTS

| | | |
|---|---|---|
| DE | 100 49 765 A1 | 5/2002 |
| EP | 0 224 817 A1 | 6/1987 |

(Continued)

OTHER PUBLICATIONS

European Patent Office, International Search Report in Swiss patent application No. CH 13902010 (dated Nov. 29, 2010).

*Primary Examiner* — Ted Kim
(74) *Attorney, Agent, or Firm* — Buchanan Ingersoll & Rooney PC

(57) ABSTRACT

A casing body for a hot gas flow includes an outer casing body having a hot gas side with a precisely prepared locating surface. A pin-type retainer is disposed on the locating surface, and an inner heat shield is disposed at a distance from the hot gas side of the outer casing body and fastened to the retainer.

18 Claims, 3 Drawing Sheets

(56) References Cited

U.S. PATENT DOCUMENTS

| | | | |
|---|---|---|---|
| 5,624,256 A | | 4/1997 | Pfeiffer et al. |
| 5,697,213 A | | 12/1997 | Brewer et al. |
| 6,045,310 A | | 4/2000 | Miller et al. |
| 6,276,142 B1 | * | 8/2001 | Putz ................................ 60/752 |
| 6,397,765 B1 | * | 6/2002 | Becker ............................. 60/752 |
| 6,718,774 B2 | * | 4/2004 | Razzell ................. F01D 25/243 60/753 |
| 7,338,244 B2 | * | 3/2008 | Glessner et al. .............. 411/401 |
| 7,874,059 B2 | * | 1/2011 | Morrison .............. F16B 5/0266 29/446 |
| 2001/0035003 A1 | * | 11/2001 | Sinha ................... F01D 25/145 60/796 |
| 2008/0127652 A1 | * | 6/2008 | Putz ................................ 60/752 |

FOREIGN PATENT DOCUMENTS

| | | | |
|---|---|---|---|
| EP | 0724116 A2 | | 7/1996 |
| EP | 1598562 A1 | | 11/2005 |
| GB | 647 302 A | | 12/1950 |
| GB | 2299391 A | * | 10/1996 |
| JP | 8026887 B4 | | 3/1996 |
| JP | 2000335500 A | | 12/2000 |

* cited by examiner

CASING BODY THROUGH WHICH HOT GASES CAN FLOW AND COMPRISING AN INNER HEAT SHIELD

CROSS REFERENCE TO PRIOR APPLICATIONS

Priority is claimed to Swiss Application No. CH 01390/10, filed Aug. 27, 2010, the entire disclosure of which is incorporated by reference herein.

FIELD

The invention relates to a casing body through which hot gases can flow, in particular of a gas turbine.

BACKGROUND

Gas turbines have an outer casing body which is cooled from outside and which is protected on its inner side facing the hot turbine gases by a heat shield at a distance from the inner side. In this case, the air between heat shield and outer casing body serves as thermal insulation. In this respect, reference is made to the following documents: U.S. Pat. No. 4,121,768 A, U.S. Pat. No. 5,083,424 A, U.S. Pat. No. 5,697,213 A, U.S. Pat. No. 6,045,310 A, EP 0 224 817 A1, EP 0 724, 116 A2, EP 1 598 562 A1, GB 647 302 A and JP 2000335500 A.

SUMMARY OF THE INVENTION

In an embodiment, the present invention provides a casing body for a hot gas flow including an outer casing body having a hot gas side with a precisely prepared locating surface. A pin-type retainer is disposed on the locating surface, and an inner heat shield is disposed at a distance from the hot gas side of the outer casing body and fastened to the retainer.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
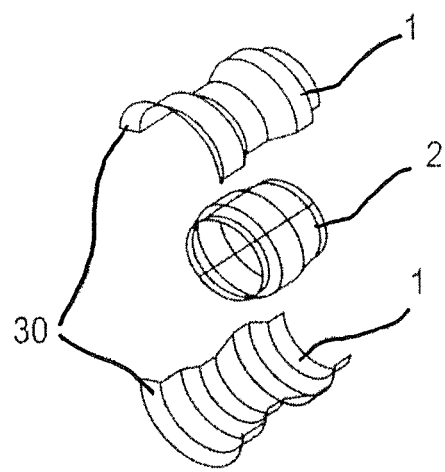
FIG. 1 shows a schematic exploded illustration of a casing (with heat shield) of a gas turbine.

Weld studs, which are arranged on the hot gas side of the outer casing body regularly composed of cast parts, often serve to fasten the heat shields or its segments. The fitting of weld studs is certainly comparatively simple, but large deviations of the fastening positions of the heat shield from an ideal position have been observed by applicants, because the welding process, on the one hand, and form tolerances of the cast parts of the outer casing body, on the other hand, lead to inaccuracies in the positioning of the weld studs. This leads to large errors in the positions of the segments of the heat shield relative to one another, with the result that the protective effect of the heat shield is impaired, because, for example, the dimensions of the gaps between successive segments of the heat shield deviate from the desired size and hot gases can penetrate into the air space between the heat shield and the inner side of the outer casing body. Apart from that, the shape of the surface of the heat shield can deviate more or less considerably from the desired shape, and so the flow zone of the hot gases is undesirably impaired.

Applicants have discovered using precise machine tools and providing precisely oriented locating surfaces for supporting the retainers of the heat shield on the hot gas side of the outer casing body.

In an embodiment, the present invention provides a design in which a virtually ideal shape of the heat shield, combined with optimum positions of its segments, can be ensured.

In an embodiment of the invention, retainers of a heat shield are supported or arranged on precisely prepared or reworked locating surfaces on the hot gas side of the outer casing body.

In an embodiment of the invention, a casing body includes an outer casing body and an inner heat shield which is arranged at a distance from the hot gas side of the outer casing body and which is fastened to pin-like retainers on the outer casing body.

According to an embodiment of the invention, provision is made for the locating surfaces to be designed as flat surfaces, and therefore the machining cost remains low. In particular, the locating surface can be formed by the bottom or an annular step of a blind hole. The machining steps at the outer casing body which are required for producing the locating surfaces can therefore be restricted to precision bores or precision milling.

Preferably, each retainer has a spacer, fitted between the associated locating surface and the heat shield, and a fixing means, the fixing means clamping the heat shield and the outer casing against one another while fixing the spacer connected in between.

In this case, the spacer provided can be a sleeve, through which a screw clamping the heat shield and the outer casing body against one another passes axially, such that the spacer formed by the sleeve is fixed in its position in a positive-locking and frictional manner.

The aforesaid screw can be inserted into a hole which is arranged on the outer casing body and is expediently produced together with the locating surface. According to a first variant, said hole can be a tapped hole, into which the screw can be screwed. Instead, it is also possible to provide, at the locating surfaces, respective holes which pass through the outer casing body, such that the screw can be put through this hole and can be screwed into a matching nut or the like. It is also possible in this case to arrange the screw the other way round; i.e. the screw is put through the hole and the sleeve from the outer side of the outer casing body and is screwed into a nut or the like to be arranged on the heat shield.

According to a preferred embodiment of the invention, the outer casing body can be formed with ribs in the region of the fastening points of the heat shield, such that the precisely oriented locating surfaces for supporting the retainers of the heat shield can be arranged on respective housing zones having a large material thickness and high loading capacity.

According to FIG. 1, a gas turbine can have an outer casing 30 which is composed substantially of two cast half shells 1 and the interior of which is lined by a heat shield 2 in regions subjected to high thermal loading.

Figure 2:
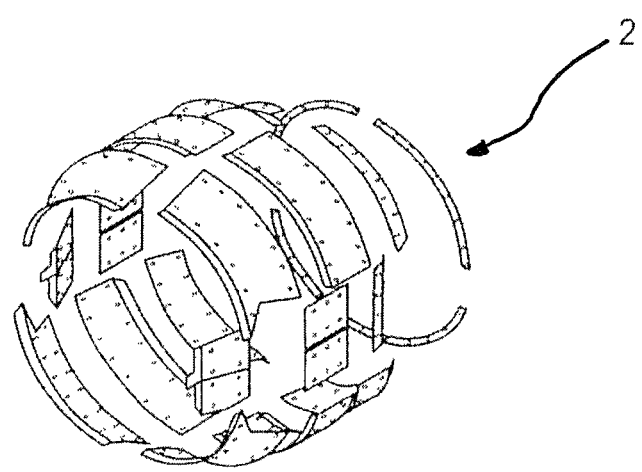
FIG. 2 shows a schematic exploded illustration of a heat shield arranged in the casing.
Figure 3:
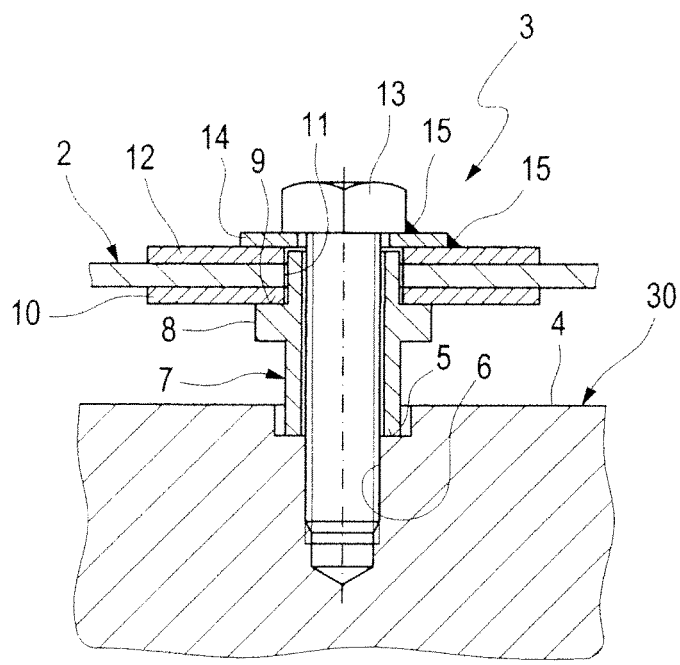
FIG. 3 shows a schematic sectional view of a retainer according to the invention of the heat shield and a segment of a heat shield.
Figure 4:
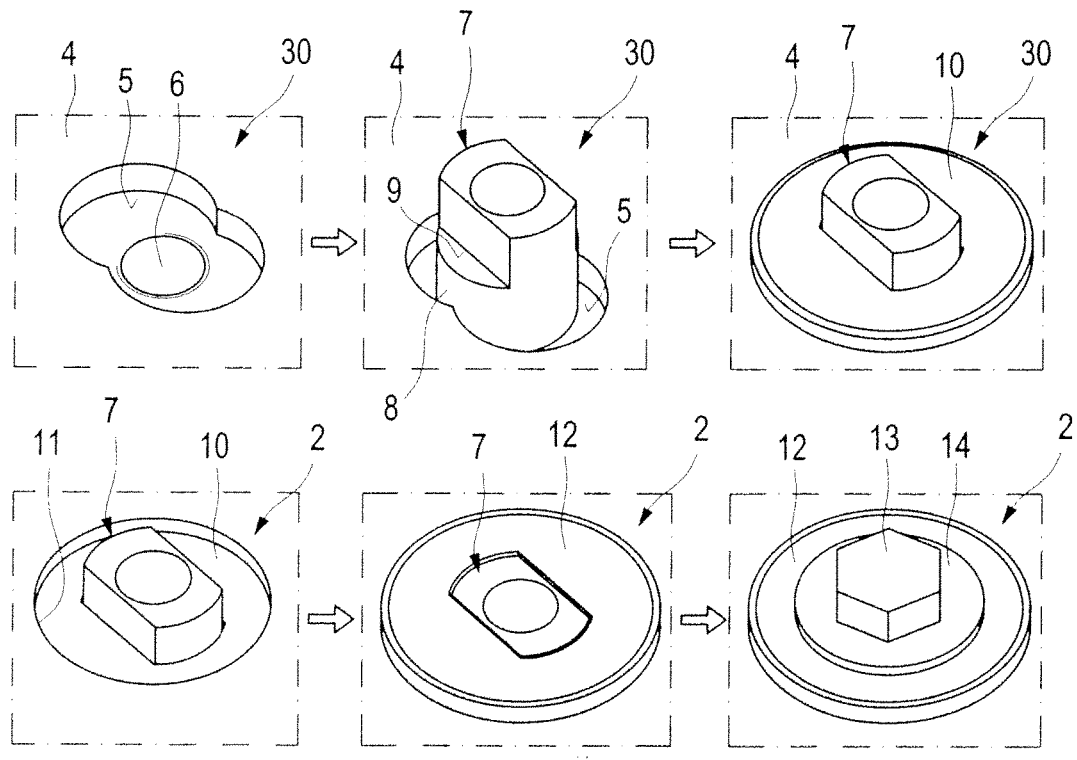
FIG. 4 shows characteristic, schematic illustrations of a sequence for mounting the heat shield.

According to FIG. 2, the heat shield 2 is of segmented design. With regard to an optimal protective effect of the heat shield 2, the aim is to arrange the segments thereof with high precision in such a way that the edges of adjacent segments abut against one another in alignment with one another with a precise gap size. Provided for this purpose according to the invention are pin-like retainers 3, which are shown in more detail in FIG. 3 and the mounting of which is explained below with reference to FIG. 4. The outer casing 30, which is shown in a cutaway view in FIG. 3, has a rough contour on the inside with more or less large deviations from an ideal or desired contour. A sunk locating surface 5 and a tapped hole 6 are produced in the rough contour 4 at a position intended for the retainer using appropriate tools.

When appropriately precise machine tools are used, the locating surface 5, produced, by way of example, as a flat surface, and the tapped hole 6 have an optimum position and inclination relative to a reference system fixed with respect to the outer casing.

A sleeve 7 designed as a high-precision standard part is put onto the locating surface 5, and that end of said sleeve 7 which faces away from the locating surface 5, above a flange 8 which is present if need be, has a noncircular cross section and a step surface 9. A first or bottom disk 10 is placed on this step surface 9, which if need be can be enlarged by that end face of the flange 8 which faces away from the locating surface 5, said disk 10 having an opening adapted to the noncircular cross section of that end of the sleeve 7 which is remote from the locating surface 5, such that the disk 10 is coupled to the sleeve 7 in a rotationally fixed manner by positive locking. The respective segment of the heat shield 2 rests on the bottom disk 10, an opening 11 adapted to the production tolerances of the segment of the heat shield 2 being provided in the segment, such that the respective segment of the heat shield 2 can be displaced on the disk 10 relative to the axis of the sleeve 7. Resting on the free top side of the segment of the heat shield 2 is a further, top disk 12, which can be designed identically to the bottom disk 10 and again has an opening adapted to the noncircular cross section of the disk-side end of the sleeve 7, such that the top disk 12, too, is coupled to the sleeve 7 in a rotationally fixed manner by positive locking. The axial length of that end of the sleeve 7 which has the noncircular cross section is slightly smaller than the sum of the thicknesses of the two disks 10 and 12 and of the segment of the heat shield 2 arranged between the disks 10 and 12. It is thus possible to frictionally clamp the segment of the heat shield 2 between the two disks 10 and 12 by means of a screw 13 which is screwed into the tapped hole 6 through the axial bore of the sleeve 7. A lock washer 14 is expediently clamped in place between the top disk 12 and the head of the screw 13 in order to prevent undesirable release of the screw 13. In addition, the screw head can be secured to the lock washer 14 in a rotationally fixed manner and the lock washer 14 can be secured to the disk 12 in a rotationally locked manner by spot welds 15.

In deviation from the preceding description, if appropriate, a non-tapped hole passing through the casing wall can also be provided in the outer casing 30 instead of the tapped hole 6, and the correspondingly long screw 13 can be screwed into a threaded part or into a nut on the outer side of the outer casing 30. Instead, it is also possible to arrange the screw 13 the other way round and screw it in from the outer side of the casing through the sleeve 7 into a nut or the like arranged on the disk 12 or the lock washer 14.

Figure 5:
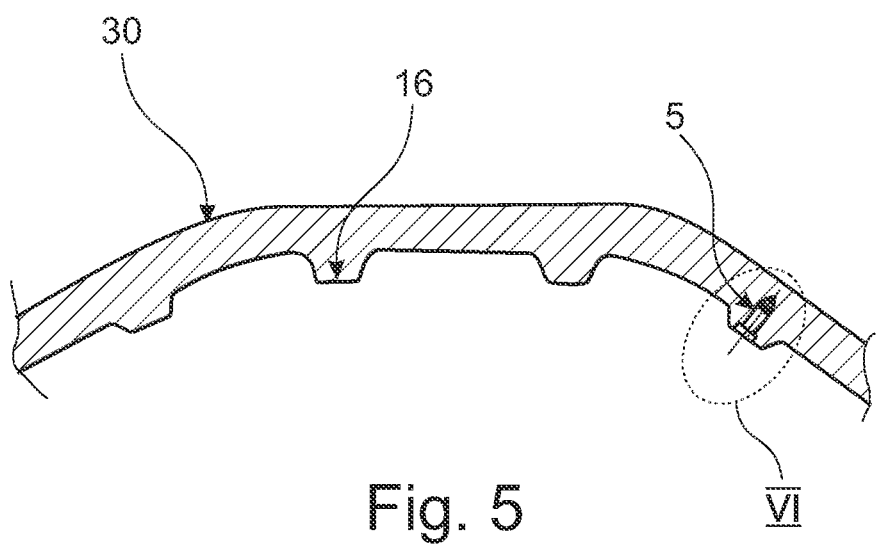
FIG. 5 shows a sectional view of an outer casing section of a preferred embodiment having ribs provided on the inside on the outer casing.
Figure 6:
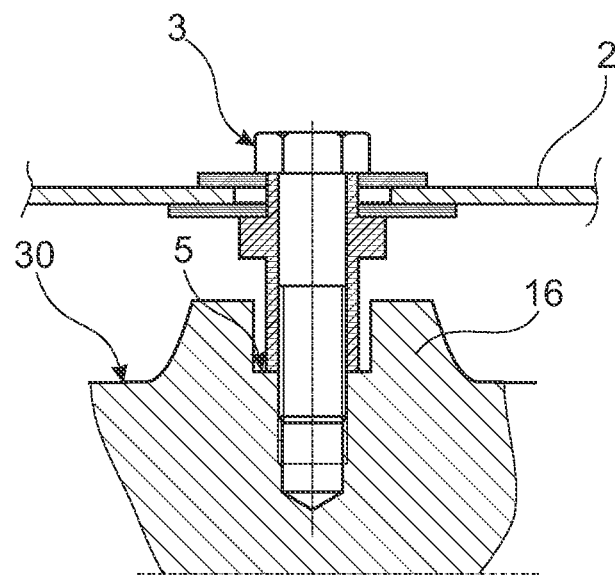
FIG. 6 shows the detail VI from FIG. 5.

FIG. 5 shows a cross section of a wall of an outer casing 30 having ribs 16 integrally formed on the inside, and FIG. 6 shows a detail of FIG. 5. In the example shown, firstly the ribs 16 serve to stiffen the wall of the outer casing body; secondly, the ribs 16 are arranged in such a way that positions of fastening points of the heat shield always fall within the region of a rib 16. This offers the advantage that the fastening points can always be arranged in regions having a large material thickness and a high loading capacity, and the material removal intended in the invention for producing optimally positioned locating surfaces 5 can be carried out without any problems. If material removal should be desired in the area surrounding the locating surface 5, only a small area on the respective rib 16 needs to be machined. Finally, it is advantageous that the heat shield 2 outside the ribs 16 can be at a comparatively large distance from the inner side of the outer casing 30, irrespective of production tolerances of the outer casing 30.

While the invention has been described with reference to particular embodiments thereof, it will be understood by those having ordinary skill the art that various changes may be made therein without departing from the scope and spirit of the invention. Further, the present invention is not limited to the embodiments described herein; reference should be had to the appended claims.

LIST OF REFERENCE NUMERALS

1 Half shells
2 Heat shield
3 Retainer
4 Rough contour
5 Locating surface
6 Tapped hole
7 Sleeve
8 Flange
9 Step surface
10 First disk
11 Opening
12 Second disk
13 Screw
14 Lock washer
15 Weld spots
16 Ribs
30 Outer casing

What is claimed is:
1. A casing body for a hot gas flow comprising:
an outer casing body having a hot gas side;
a segmented inner heat shield;
a countersink disposed on the hot gas side and a precisely prepared sunken locating surface disposed in the countersink;
a pin-type retainer disposed on the sunken locating surface, the retainer including a separate spacer disposed on the sunken locating surface and extending from the hot gas side, the spacer including a first abutment surface abutting the sunken location surface and a second abutment surface;

a fixing element clamping the inner heat shield and the outer casing body to one another such as to fix the spacer and to clamp the inner heat shield to the second abutment surface; and wherein the inner heat shield is clamped on the second abutment surface between a first disk and a second disk, the first disk and the second disk each having an opening, the openings receiving the spacer.

2. The casing body as recited in claim 1, wherein the casing body is a casing body of a gas turbine.

3. The casing body as described in claim 1, wherein at least one of the spacer and the fixing element are positively locked to at least one of the outer casing body and the inner heat shield.

4. The casing body as recited in claim 1, wherein the spacer is a sleeve, and wherein the fixing element is a screw, the screw extending axially through the sleeve so as to clamp the inner heat shield and the outer casing body against one another.

5. The casing body as recited in claim 4, wherein the sunken locating surface includes a hole configured to receive the screw.

6. The casing body as recited in claim 5, wherein the screw is screwed into an internal thread of the hole.

7. The casing body as recited in claim 1, wherein the openings of each of the first disk and the second disk are each an adapted noncircular opening and the spacer includes a corresponding noncircular cross section that engages in the noncircular openings so as to rotationally fix the first and second disks to the spacer.

8. The casing body as recited in claim 1, wherein the outer casing body includes ribs disposed on an inside of the outer casing body, and wherein the retainer is disposed in a region of the ribs.

9. The casing body as recited in claim 1, wherein the sunken locating surface is a flat surface.

10. The casing body as recited in claim 1, wherein the second abutment surface is formed on a step or flange provided on the spacer.

11. The casing body as recited in claim 1, wherein the fixing element is a screw comprising a screw head, and the inner heat shield is clamped between the second abutment surface and the screw head.

12. The casing body as recited in claim 1, wherein the first disk is provided between the inner heat shield and the second abutment surface.

13. The casing body as recited in claim 1, wherein the spacer is a sleeve and the fixing element is a screw, the screw extending axially through the sleeve and into a hole provided in the locating surface of the outer casing body and receiving a part of the screw such as to clamp the inner heat shield and the casing body against one another with the sleeve clamped between them.

14. The casing body as recited in claim 13, wherein the screw is screwed into the hole provided in the locating surface.

15. The casing body as recited in claim 1, wherein the spacer comprises at an end facing away from the locating surface and above a flange on which the second abutment surface is provided, a protrusion, wherein the protrusion exhibits a non-circular cross section, and each of the first and second disks exhibits a corresponding non-circular opening, said openings receiving the protrusion, such as to rotationally fix the disks on the spacer.

16. The casing body as recited in claim 15, wherein each segment of the inner heat shield comprises an opening in which the protrusion is received, wherein the opening is dimensioned such that a play is provided between the segment of the inner heat shield and the spacer, and/or the inner heat shield can be displaced on the first disk relative to an axis of the spacer.

17. The casing body as recited in claim 1, wherein edges of adjacent segments of the segmented inner heat shield abut against one another in alignment with one another with a precise gap size.

18. A casing body for a hot gas flow comprising:
an outer casing body having a hot gas side;
a segmented inner heat shield;
a countersink disposed on the hot gas side and a sunken locating surface disposed in the countersink;
a pin-type retainer disposed on the sunken locating surface, the retainer including a separate spacer disposed on the sunken locating surface and extending from the hot gas side, the spacer including a first abutment surface abutting the sunken location surface and a second abutment surface;
a fixing element clamping the inner heat shield and the outer casing body to one another such as to fix the spacer and to clamp the inner heat shield to the second abutment surface; and
wherein the inner heat shield is clamped on the second abutment surface between a first disk and a second disk;
wherein the spacer comprises at an end facing away from the locating surface and above a flange on which the second abutment surface is provided, a protrusion, wherein the protrusion has a non-circular cross section, and each of the first and second disks each has a corresponding non-circular opening, said openings receiving the protrusion, such as to rotationally fix the disks on the spacer; and
wherein a length of the protrusion which has the non-circular cross section is smaller than a sum of thicknesses of the first and second disks and the segment of the heat shield.

* * * * *